June 25, 1963
L. BRADT ETAL
3,094,944
TOW TRUCK SYSTEM
Filed Nov. 6, 1961
3 Sheets-Sheet 1
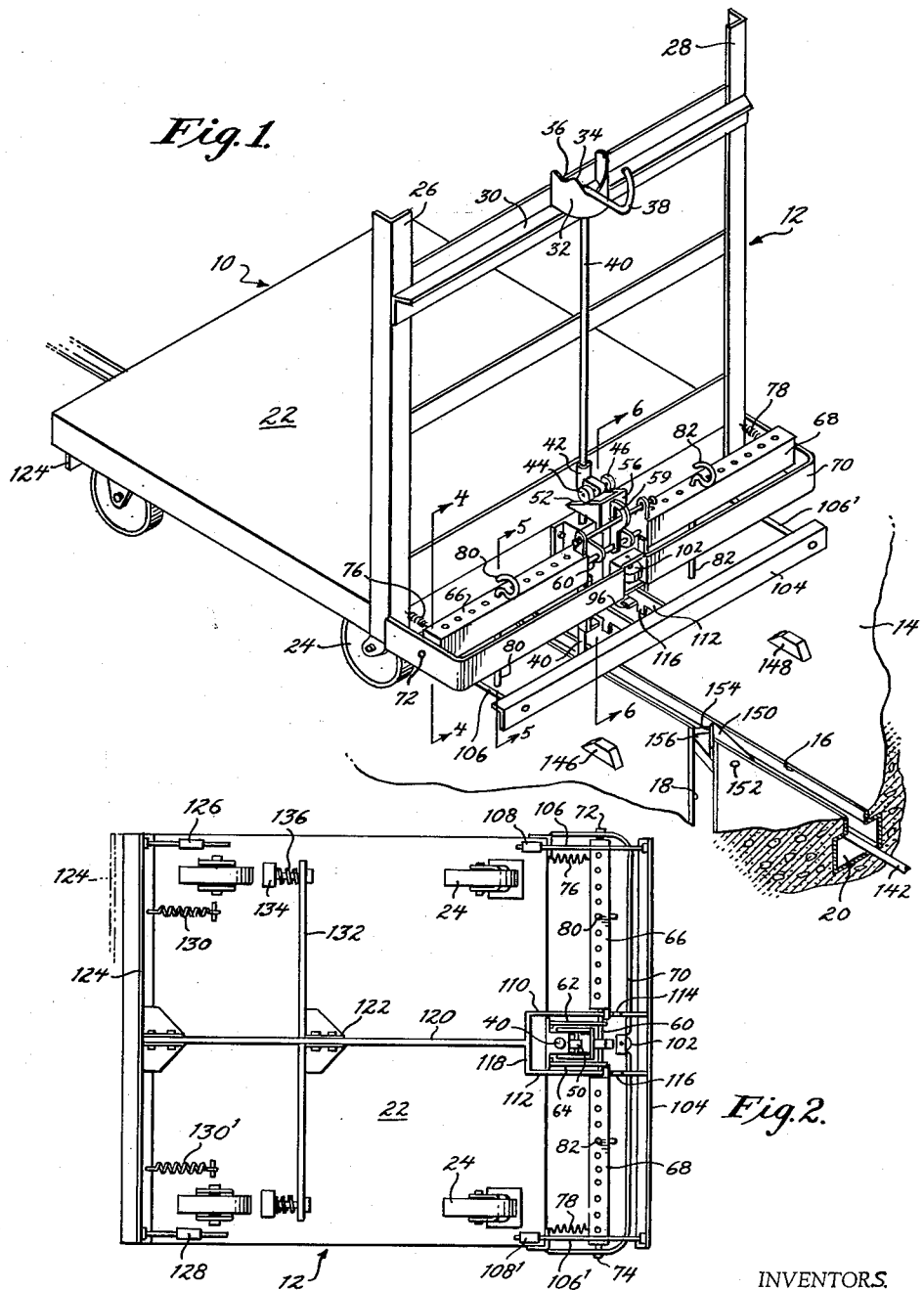
INVENTORS.
LYNN BRADT
JOHN G. DORRANCE
BY
Arthur H. Seidel
ATTORNEY.

June 25, 1963 L. BRADT ETAL 3,094,944
TOW TRUCK SYSTEM
Filed Nov. 6, 1961 3 Sheets-Sheet 2

INVENTORS.
LYNN BRADT
JOHN G. DORRANCE
BY
Arthur H. Seidel
ATTORNEY.

June 25, 1963

L. BRADT ETAL 3,094,944

TOW TRUCK SYSTEM

Filed Nov. 6, 1961

INVENTORS.
LYNN BRADT
JOHN G. DORRANCE
BY

Arthur H. Seidel

ATTORNEY.

United States Patent Office 3,094,944
Patented June 25, 1963

3,094,944
TOW TRUCK SYSTEM
Lynn Bradt, Easton, Pa., and John G. Dorrance, Phillipsburg, N.J., assignors to S.I. Handling Systems, Inc., Phillipsburg, N.J.
Filed Nov. 6, 1961, Ser. No. 150,271
20 Claims. (Cl. 104—172)

This invention relates to a tow truck system. More particularly, this invention relates to a tow truck system wherein a truck is towed by means of a tow pin extending through a main slot so that the truck may be automatically directed to a preselected shunt slot.

In a tow truck system, a tow pin on a truck extends through a main slot for engagement with a tow line dog which causes the truck to move along the main slot. A plurality of shunt slots intersect the main slot at spaced points therealong. Means are provided to interrupt the propelling effect caused by the engagement between the tow pin and the dog and thereafter switch the truck into a preselected area having a shunt slot communicating with the main slot.

A tow truck system is particularly adaptable for use in warehouses, freight terminals, and the like. The area into which the shunt slot extends may be a loading, an unloading, or a storage area. The function of the area is not important, but its location relative to the main slot is important. The dragline having dogs at spaced points therealong may be disposed beneath the main slot in or on the floor of a building or the like or may be disposed overhead. If the main slot is disposed in the floor, metal flanged elements defining the main slot and shunt slots are generally flush with the floor.

The truck of the present invention is provided with a gravity biased vertically disposed and adjustable tow pin in the front of the truck. Such tow pin extends into and is guided by the main slot. The truck is preferably provided with wheels which engage the floor of the building or the like. The truck of the present invention is provided with a pushing bumper and an accumulation bumper on the front thereof. Also, such truck is provided with a rear bumper movable to an effective disposition in response to a movement of the accumulation bumper.

The truck of the present invention is provided with means including a pair of trip rods on opposite sides of the tow pin. When the trip rods are actuated simultaneously, the tow pin is caused to move vertically out of engagement with the dog on the dragline. Thereafter, the truck may be directed from the main slot to a shunt slot. If only one trip rod is actuated, the tow pin does not move out of engagement with the dog. Means are provided for varying the spacing of the trip rod on each side of the tow pin so that the number of shunt slots with which the truck may be utilized is the number of trip rod spaces on one side of the tow pin multiplied by the number of trip rod spaces on the other side of the tow pin.

The accumulation bumper of the truck of the present invention is interconnected with a brake means so that the rear wheels may be braked in response to movement of the accumulation bumper. Also, the accumulation bumper is structurally interrelated with a latch means for causing vertical movement of the tow pin when the accumulation bumper contacts the rear bumper of another vehicle.

It is an object of the present invention to provide a novel tow truck system.

It is another object of the present invention to provide a tow truck system wherein means are provided for raising a tow pin out of engagement with a dog on a dragline in response to simultaneous actuation of a pair of trip rods disposed on opposite sides of the tow pin or in response to the only trip rod provided.

It is another object of the present invention to provide a tow truck system wherein a tow truck is provided with an accumulation bumper which is convertible into a pushing bumper.

It is still another object of the present invention to provide a tow truck system wherein a truck is provided with a tow pin adapted for vertical movement in response to actuation of a trip rod means and/or movement of an accumulation bumper.

It is still another object of the present invention to provide a novel tow truck.

It is still another object of the present invention to provide a tow truck wherein an accumulation bumper on a front end of the truck is adapted to move a rear bumper into a predetermined pushing disposition so that it can actuate an accumulation bumper on another truck.

It is still another object of the present invention to provide a tow truck system having a truck wherein an accumulation bumper on the truck is adapted to apply brakes on wheels of said truck and move a rear bumper into a predetermined pushing disposition.

It is a further object of the present invention to provide a tow truck system wherein a tow truck is provided with a reciprocally disposed gravity biased tow pin having its lower end in abutting contact with a dog on a dragline, and wherein means are provided for camming the tow pin in a vertical direction so as to separate the lowermost end of the tow pin from engagement with the dog.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a perspective view of the tow truck system of the present invention.

FIGURE 2 is a bottom plan view of the tow truck shown in FIGURE 1.

Figure 3:
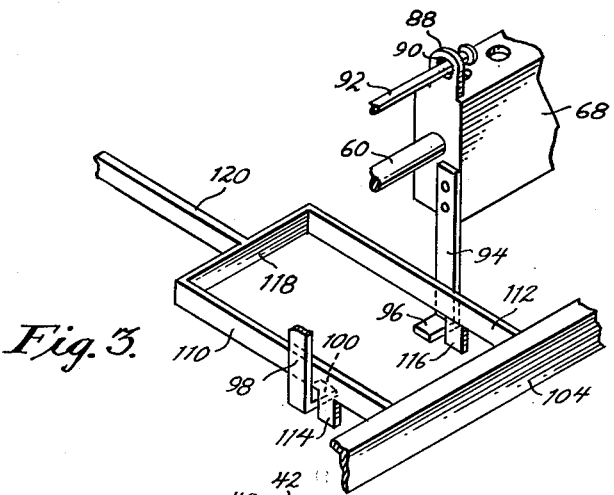
FIGURE 3 is a fragmentary perspective view of a portion of the tow truck shown in FIGURE 1.

Referring to the drawing in detail, wherein like numerals indicate like elements, there is shown in FIGURE 1 a tow truck system designated generally as 10. The tow truck system 10 includes a truck 12 supported for rolling engagement on a floor 14 of a building or the like. The floor 14 includes a main slot 16 which is intersected by a shunt slot 18. The longitudinal axis of the shunt slot 18 is disposed at an acute angle with respect to the longitudinal axis of the main slot 16. The main slot 16 is defined by a channel-shaped member 20 imbedded in the floor 14. A similar channel-shaped member will be provided to define the shunt slot 18.

While only one shunt slot is illustrated in the drawing, it will be appreciated that a substantially larger number of shunt slots are provided at spaced points along the main slot 16. The shunt slots may extend to either side of the main slot 16. As will be made clear hereinafter, the truck 12 is caused to move along the main slot 16 until it reaches the intersection of the main slot and a predetermined shunt slot. When the truck reaches the predetermined shunt slot, the truck is caused to automatically switch from the main slot to the predetermined shunt slot.

The truck 12 comprises a base 22 mounted on a plurality of wheels 24. A pair of upright standards 26 and 28 are secured to the front end of the base 22 in any convenient manner. A brace 30 in the form of an angle iron extends between the standards 26 and 28. The brace 30 supports a latch member 32 which is in the form of a curved wall. The latch member 32 is provided with a V-shaped cam surface 34 which extends upwardly to a pair of handle notches 36.

A handle 38 on a tow pin 40 may be manually disposed on the handle notches 36 or on the apex of the cam surface 34. The tow pin 40 is vertically disposed in front of the truck 12 substantially equidistant from the standards 26 and 28. The tow pin 40 is provided with a selectively adjustable collar 42.

A selectively operable latching means is provided for camming the tow pin 40 upwardly for a predetermined distance. Such means includes a pair of rollers 44 and 46 rotatably mounted on a pin 48. The pin 48 is supported by a bracket 50 on the collar 42. The roller 44 is in engagement with an inclined cam surface 52. The roller 46 is in engagement with an inclined cam surface 54. The inclined cam surfaces 52 and 54 extend from a base plate 56. The base plate 56 is rotatably mounted about a pin 60 by means of a P-shaped arm 58. The arm 58 is provided with a hole 59 and is rigidly secured to the plate 56. The pin 60 is supported by a pair of spaced brackets 62 and 64 extending from the forward end of the base 22.

A selectively operable means is provided for actuating the latching means. Such selectively operable means includes a channel member 66 on one side of the tow pin 40 and a channel member 68 on the other side of the tow pin 40. A pushing bumper 70 is disposed on the forward portion of the base 22. As shown more clearly in FIGURE 2, one end of the member 66 is provided with a pin 72 rotatably mounted in the bumper 70. The other end of the member 66 is provided with a pin rotatably mounted in the bracket 62. Likewise, the member 68 is provided with a pin 74 rotatably mounted in the bumper 70 and a pin rotatably mounted in the bracket 64.

Thus, it will be seen that the members 66 and 68 are rotatably mounted about a horizontal axis. A spring 76 maintains the member 66 in the disposition illustrated in FIGURE 1. A spring 78 maintains the member 68 in the disposition illustrated in FIGURE 1. As shown core clearly in FIGURE 5, the members 66 and 68 are C-shaped in transverse cross section. A plurality of aligned holes extend through the horizontally disposed arms of the member 66 and the member 68 at spaced points therealong as illustrated more clearly in FIGURES 1 and 2. A trip rod 80 extends through a pair of aligned holes in the member 66. A trip rod 82 extends through a pair of aligned holes in the member 68. As shown, the uppermost end of the trip rods 80 and 82 are provided with a hook portion which limits the vertical disposition of the trip rods so that the lowermost end of said rods are spaced from the surface of the floor 14 by a predetermined distance.

Figure 5:
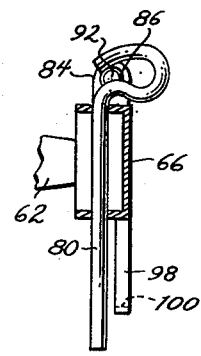
FIGURE 5 is a sectional view taken along the lines 5—5 in FIGURE 1.

As shown more clearly in FIGURES 1 and 5, the member 66 is provided with an ear 84 at the end thereof adjacent the bracket 62. The ear 84 is provided with an enlarged hole 86 extending therethrough. As shown more clearly in FIGURE 3, the member 68 is provided with an ear 88 at its end adjacent to the bracket 64. The ear 88 is provided with a hole 90 extending therethrough. A bar 92 extends through the holes 86 and 90 and the hole 59 in the arm 58. Each of these holes are of a size which is substantially larger than a transverse dimension of the bar 92. Any convenient means such as a cotter pin may be provided at the ends of the bar 92 so as to maintain the same assembled disposition. The effect of the relationship between the enlarged holes 59, 86 and 90 and the bar 92 will be made clear hereinafter.

As shown more clearly in FIGURE 3, a bracket arm 94 extends downwardly from the member 68. The arm 94 is provided with a flange 96 extending toward the member 66. The member 66 is provided with a downwardly extending bracket arm 98. The arm 98 is provided with a flange 100 extending toward the bracket arm 94. The bumper 70 is provided with a wheel 102 rotatably mounted about a vertical axis at a point opposite the arm 58.

A movable accumulation bumper 104 is supported on the truck 12 at a point forward of the bumper 70. As illustrated, the bumper 104 is mounted for reciprocation as illustrated more clearly in FIGURE 4. Thus, the bumper 104 is provided with horizontally extending shafts 106 and 106' at opposite ends thereof. The shafts 106 and 106' are reciprocally supported within guide sleeves 108 and 108', respectively. The guide sleeves 108 and 108' are supported in depending relation from the base 22.

Means are provided on the accumulation bumper 104 for selective cooperation with the bracket arms 94 and 98 to cause lifting of the tow pin 40 in response to horizontal movement of the bumper 104. Such means includes a pair of horizontally disposed arms 110 and 112 extending from the bumper 104 as shown more clearly in FIGURES 2 and 3. The arm 110 is provided with a depending finger 114 adapted to engage the flange 100. The arm 112 is provided with a depending finger 116 adapted to engage the flange 96.

A cross member 118 interconnects the free ends of the arms 110 and 112.

Means are provided to apply brakes to the truck 12 and move a rear bumper on the truck 12 to an operative disposition in response to reciprocation of the accumulation bumper 104. Such means includes a rod 120 extending from the cross member 118 as shown more clearly in FIGURES 2 and 3. The rod 120 extends through a guide sleeve 122 supported in depending relation from the bottom of the base 22. The end of the rod 120 remote from the cross member 118 extends into and is fixedly secured to a sleeve on a rear bumper 124.

As shown more clearly in FIGURE 2, the rear bumper 124 extends across the rear of the base 22 and is spaced inwardly from the rear edge of the base 22. The rear bumper 124 is mounted for reciprocation by means of shafts at opposite ends thereof extending through guide sleeves 126 and 128. The guide sleeves 126 and 128 are supported in depending relation from the bottom of the base 22. The rear bumper 124 and the accumulation bumper 104 are biased to the position illustrated in FIGURE 2 by means of springs 130 and 130'. The springs 130 and 130' have one end interconnected with the rear bumper 124 and another end interconnected with the base 22.

As shown more clearly in FIGURE 2, a brake crossbar 132 is connected to the rod 120 and extends from opposite sides thereof. A brake shoe 134 is supported by each end of the bar 132. Each brake shoe is secured to a pin extending through the bar 132 with a spring 136 surrounding each pin. In this manner, a resilient interconnection is provided between the brake shoe 134 and the bar 132 whereby a smooth braking action is provided.

Figure 4:
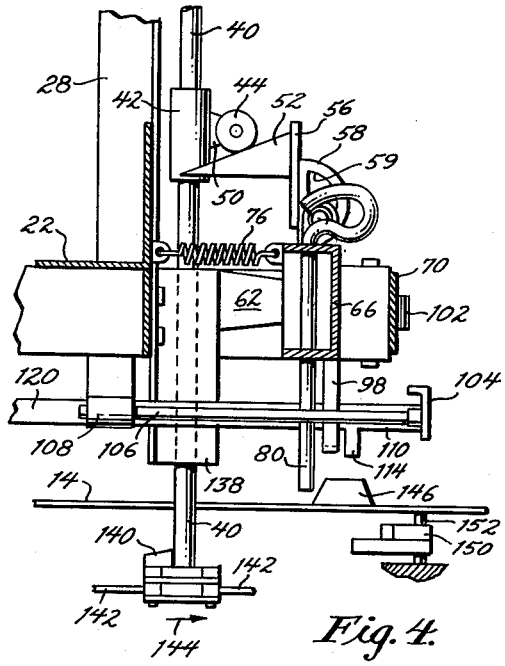
FIGURE 4 is a sectional view taken along the lines 4—4 of FIGURE 1.

As shown more clearly in FIGURE 4, the tow pin 40 extends through a bearing 138 with the lowermost end of the tow pin extending into the main slot 16. Under force of gravity, the tow pin 40 assumes a position so that its lowermost end may be contacted by a dog 140 on a dragline 142 which is moving in the direction of arrow 144, see FIGURE 4.

Abutments 146 and 148 are on the floor 14 on opposite sides of the main slot 16. The abutments 146 and 148 are normally spring biased to the position shown but may be flush with the floor for actuation by magnets, cams, etc. The trip rods 80 and 82 have been disposed within particular aligned holes in the members 66 and 68 so as to traverse a path wherein the trip rod 80 will engage abutment 146 and trip rod 82 will engage abutment 148.

A switching means is provided at the intersection of the main slot 16 and the shunt slot 18 of the type illustrated in Patent 2,936,718. Such switching means includes a multilevel switch plate 150 disposed below the plane of the floor 14. The switch plate 150 is rotatably mounted about the pivot pin 152. The switch plate 150 includes cam surfaces 154 and 156. The cam surface 154 lies in a plane which is lower than the plane in which the cam surface 156 is located.

Figure 7:
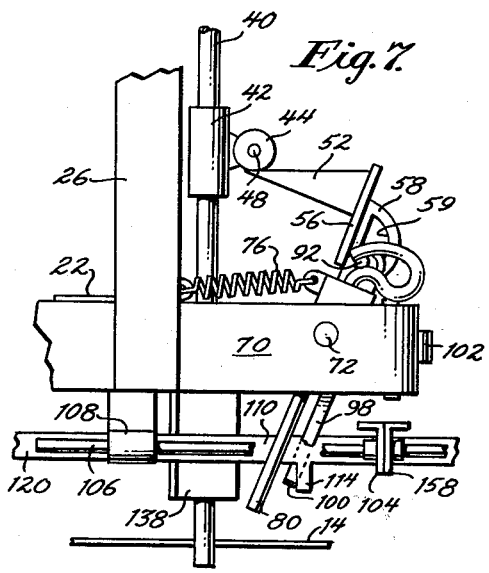
FIGURE 7 is a side elevation view of the lower front corner of the truck shown in FIGURE 1, but showing the accumulation bumper in contact with the rear bumper of another truck similar to the truck shown in FIGURE 1.

As shown more clearly in FIGURE 7, the accumulation bumper 104 lies in the same plane as a rear bumper 158 on another truck similar to truck 12. The rear bumper 158 is identical with the rear bumper 124 on the truck 12.

The operation of the tow truck system 10 of the present invention is as follows:

The truck 12 may be in any particular area of a building which for example may be a loading area. While at this position, the handle 38 will be in the notch 36 so that the lowermost end of the tow pin 40 will be spaced from the floor 14. When the truck 12 has been loaded, the operator will choose the particular area and shunt slot to which it is desired to dispatch the truck 12. For purposes of illustration, it will be assumed that shunt slot 18 is the selected shunt slot.

In order to dispatch the truck 12 to the area having shunt slot 18, the operator positions the trip rods 80 and 82 in the aligned holes of the members 66 and 68 in the position illustrated in FIGURE 1. Thereafter, the truck 12 will be manually pushed so as to assume a disposition over the main slot as illustrated in FIGURE 1. Then the handle 38 will be manually raised and rotated, and then allowed to fall due to gravity to the disposition illustrated in FIGURE 1 wherein the tow pin 40 extends into the main slot for engagement with a dog on the dragline 142. The next dog, which may be dog 140, on the continuously moving dragline 142 contacts the lowermost end of the tow pin 40 thereby causing the truck 12 to move along the main slot 16.

Figure 8:
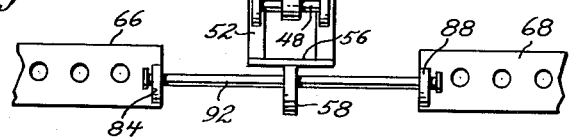
FIGURE 8 is a diagrammatic plan view of the tow pin and its actuating means, with the tow pin being in its lowermost disposition.
Figure 11:
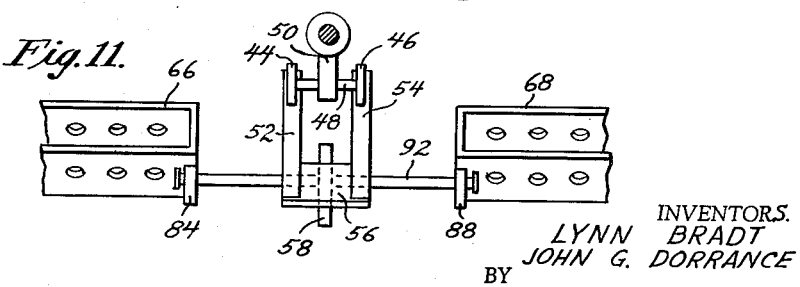
FIGURE 11 is a diagrammatic view similar to FIGURE 8 illustrating the effect of simultaneous actuation of trip rods on opposite sides of the tow pin.
Figure 6:
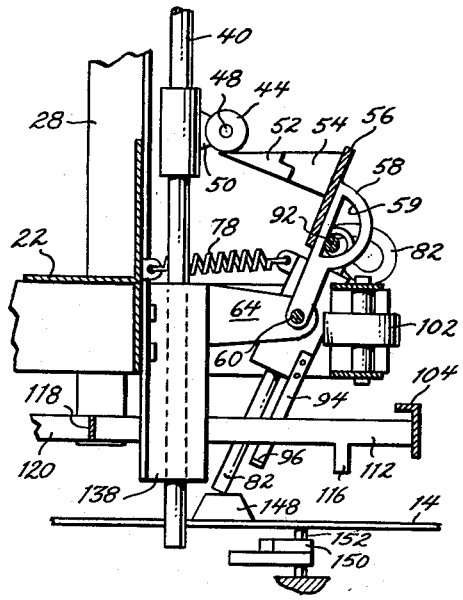
FIGURE 6 is a sectional view taken along the lines 6—6 in FIGURE 1, but showing the tow pin actuating means in its tripped disposition.

As the truck 12 approaches the intersection of the shunt slot 18 and the main slot 16, the trip rods 80 and 82 simultaneously engage the abutments 146 and 148. This engagement causes the members 66 and 68 to rotate from the position illustrated in FIGURES 1 and 8 to the position illustrated in FIGURE 11. The simultaneous rotation of the members 66 and 68 causes the rod 92 to pivot the arm 58 about the pin 60. As the arm 58 pivots from the disposition illustrated in FIGURE 4 to the disposition illustrated in FIGURE 6, the inclined cams 52 and 54 cause the tow pin 40 to move in a vertical direction for a predetermined distance so that the lowermost end of the tow pin 40 remains in the main slot 16 but out of contact with the dog 140.

Since the lowermost end of the tow pin 40 is now out of contact with the dog 140, it contacts the cam surface 156 and is thereby directed into the shunt slot 18. The swich plate 150 normally assumes the position illustrated in FIGURE 1 under the influence of a spring (not shown) thereby obstructing the main slot 16. If shunt slot 18 were not the slot preselected by the operator, either one or neither of the trip rods 80 and 82 would be actuated by an abutment on the floor 14. If one of the trip rods 80 and 82 were actuated by an abutment adjacent the intersection of a shunt slot and the main slot, the disposition of the members 66 and 68 and rod 92 would be as illustrated in FIGURE 9 or FIGURE 10.

Figure 9:
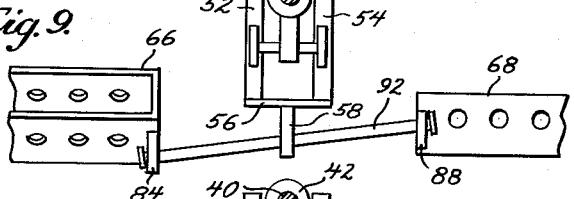
FIGURE 9 is a diagrammatic view similar to FIGURE 8 illustrating the effect of actuation of only one trip rod.
Figure 10:
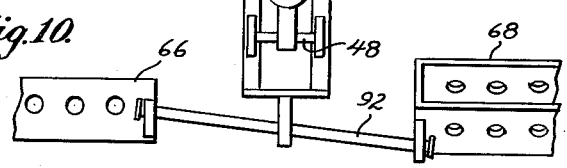
FIGURE 10 is a diagrammatic view similar to FIGURE 9 illustrating the effect of actuation of only another one of the trip rods.

As illustrated in FIGURES 9 and 10, the actuation of only one of the trip rods 80 and 82 does not cause the arm 58 to pivot about the pin 60 thereby raising the tow pin 40. The holes in the ears 84 and 88 and the hole 59 in the arm 58 are substantially larger than the diameter of the rod 92. Accordingly, when only one of the members 66 and 68 are caused to rotate, the opposite end of the rod 92 is permitted to pivot thereby preventing the rod 92 from contacting the arm 58 with sufficient force to rotate the same. Thus, it will be clear that the trip rods 80 and 82 must be actuated simultaneously in order to cause vertical movement of the tow pin 40.

Whenever a truck 12 has been diverted into a shunt slot, it is necessary to provide means to apply brakes on the trucks. Such means includes the accumulation bumper 104 which is caused to reciprocate in a rearward direction upon contact with the rear bumper of another truck or some other obstruction. Such rearward movement of the accumulation bumper 104 applies the brakes of the truck 12, repositions the rear bumper 124 so that it assumes the phantom position illustrated in FIGURE 2 and raises the tow pin 40 out of engagement with the dog 140 as illustrated in FIGURE 7. When a truck does not travel along the shunt slot 18 for a sufficient distance, the bumper 70 of a following truck will contact a rear surface on the base of such vehicle and physically push the same along the shunt slot. This pushing moves the vehicles along the shunt slot and assures a clear path along the main slot.

As illustrated, the truck 12 is provided with separate members 66 and 68 on opposite sides of the tow pin 40. Each of the members 66 and 68 may be provided with a plurality of trip rod receiving holes or the like. As illustrated, each member 66 and 68 is provided with ten holes for receiving the trip rod thereon. Thus, the truck 12 may be utilized in a tow truck system having up to one hundred shunt slots extending from either side of the main slot 16. Thus, it will be seen that the truck 12 is a universal type truck which may be utilized with a plurality of different tow truck systems having a minimum of one shhnt slot and a maximum number of shunt slots may be varied by varying the number of trip rod positions on the members 66 and 68.

Occasionally, it is desirable to leave the truck 12 with the tow pin 40 in its raised disposition so that the lowermost end of the tow pin 40 is spaced from the floor 14. In order that this may be accomplished, the handle 38 may be manually raised and then rotated through an arc of approximately ninety degrees and then released so that the handle 38 is received within one of the notches 36.

It will be apparent that the brake shoes 134 remain in engagement with the rear wheels of the truck 12 and that the tow pin 40 remains in an intermediate position so as to be clear of dogs on the dragline 142 when the accumulation bumper 104 has been biased to the left in FIGURES 1 and 7. Thus, the truck 12 will remain in this position until the truck or other obstacle in front thereof has been removed. Also, it will be noted that in the operative disposition of the accumulation bumper 104 as illustrated in FIGURE 7, the accumulation bumper 104 is disposed inwardly of the pushing bumper 70. Therefore, the truck 12 may be utilized in this disposition to push another truck which is disposed in front thereof and whose brakes have not been applied.

It is within the scope of the present invention to extend member 66 across the full width of the vehicle. In this case, elements 58, 59, 68, 82, 92 and 148 will be eliminated. The ends of member 66 will be rotatably mounted and member 56 will be secured thereto for rotation therewith. Accordingly, only one trip rod will be required.

The present invention may be embodied in other specific forms without departing from the spirit or essential attributes thereof and, accordingly, reference should be made to the appended claims, rather than to the foregoing specification as indicating the scope of the invention.

We claim:

1. A tow truck system comprising means defining a main slot, a truck mounted for movement along said main slot by means of engagement between a tow pin on said truck and a portion of a dragline, the direction of said dragline corresponding to the direction of said main slot, a movably mounted accumulation bumper on said truck, a rear bumper, means supporting said rear bumper on said truck so that said rear bumper has an operative disposition wherein it may cause accumulation of other trucks and an inoperative position wherein it cannot cause accumulation of other trucks, and means structurally interconnecting said accumulation bumper with said rear bumper on said truck so that said rear bumper is moved to an operative disposition in response to movement of said accumulation bumper.

2. A tow truck system in accordance with claim 1 including means for moving said tow pin out of engagement with said portion of the dragline in response to movement of said accumulation bumper toward said rear bumper.

3. A tow truck system in accordance with claim 1 including means for braking the movement of said truck in response to said movement of said accumulation bumper.

4. A tow truck system in accordance with claim 1 including means for moving said tow pin out of engagement with said portion of the dragline in response to said movement of said accumulation bumper, means for braking the movement of said truck in response to said movement of said accumulation bumper, and said tow pin being gravity biased to a lowermost position so that a lowermost end of said tow pin may engage a portion of said dragline.

5. A truck for use in a tow truck system wherein the truck will be mounted for movement in the direction of a main slot, said truck comprising a base mounted on wheels, an upright portion on a front end of said base, an upright tow pin supported for reciprocatory movement by said upright portion, said tow pin being biased to a lowermost position, and a selectively operable means on said truck for opposing the bias of said tow pin and raising said tow pin through a predetermined distance, said means including a trip rod having its longitudinal axis generally parallel to said tow pin and mounted for rotation about an axis extending in a transverse direction across said base.

6. A truck in accordance with claim 5 wherein said selectively operable means includes a second trip rod and a cam responsive only to simultaneous actuation of said first and second trip rods for camming said tow pin upwardly.

7. A truck in accordance with claim 5 including a movable rear bumper mounted on the rear end of said base, and linkage interconnecting said bumpers so that said rear bumper moves to an operative disposition in response to movement of said accumulation bumper to its operative disposition.

8. A truck in accordance with claim 5 wherein said selectively operable means includes first and second elongated members on opposite sides of said tow pin, means rotatively supporting said members for rotation about an axis traversing said base, each member including means accommodating a trip rod in one of a plurality of predetermined spaced positions along its length, each trip rod extending downwardly from its respective member, and each trip rod having its longitudinal axis substantially parallel to the longitudinal axis of said tow pin.

9. A truck in accordance with claim 5 including an accumulation bumper supported by said base for movement between first and second positions, and means interconnecting said bumper and said tow pin in a manner so that movement of said bumper from said first position to said second position causes movement of said tow pin.

10. A truck comprising a base mounted on wheels, an accumulation bumper movably mounted on the front end of said base for movement between an operative and an inoperative disposition, a rear bumper movably mounted on the rear end of said base, said rear bumper being mounted for movement between an operative and an inoperative disposition, linkage interconnecting said bumpers so that movement of said accumulation bumper to its operative disposition and toward said rear bumper causes said rear bumper to move to its operative disposition wherein it projects beyond said rear end of said base, and means biasing said bumpers to their inoperative disposition.

11. A truck in accordance with claim 10 wherein said biasing means includes said linkage and a spring interconnected with one of said bumpers.

12. A truck in accordance with claim 10 wherein said accumulation bumper is mounted for reciprocation between its operative and inoperative dispositions.

13. A truck in accordance with claim 10 wherein said rear bumper is mounted for reciprocation between its operative and inoperative dispositions.

14. A truck in accordance with claim 10 including brake shoes disposed adjacent a pair of the wheels on said base, and linkage interconnecting said brake shoes and said accumulation bumper so that said brake shoes engage said pair of wheels when said accumulation bumper is in its operative disposition.

15. A truck in accordance with claim 10 including an upright tow pin supported by said base for reciprocation between an uppermost position and a lowermost position, and means responsive to movement of said accumulation bumper to its operative disposition for raising said tow pin in a direction toward its uppermost position.

16. A truck in accordance with claim 10 including an upright tow pin supported by said base for reciprocation between an uppermost position and a lowermost position, and selectively operable means including trip rods on opposite sides of said tow pin for selectively raising said tow pin in a direction toward its uppermost position.

17. A truck in accordance with claim 16 wherein said trip rods are structurally interrelated with said tow pin so that movement of said tow pin results only with simultaneous actuation of said trip rods.

18. A truck comprising a base, an upright tow pin reciprocally supported by said base for movement between an uppermost position and a lowermost position, a cam mounted on said base, means coupled to said tow pin and in engagement with said cam, said tow pin being biased to its lowermost position, and selectively operable means including selectively positionable trip rods on opposite sides of said tow pin, said rods forming a line which extends transversely across the front end of said base, means interconnecting said cam and said trip rods so that said cam cooperates with said coupling means to cause said tow pin to move in a direction toward its uppermost position in response only to simultaneous actuation of said trip rods.

19. A truck comprising a base mounted on wheel means, an upright member on one end of said base, an upright tow pin mounted for movement, said member guiding said tow pin, said tow pin being biased to its lowermost position, means selectively operable for opposing said bias on said pin and for moving said pin through a predetermined distance, said means including an element having its ends rotatably supported at said one end of said base for rotation about a transverse substantially horizontal axis, a trip rod, means coupling said element and said tow pin so that rotation of said element moves said tow pin, said element including means for removably positioning the trip rod at any one of a plurality of points along said element so that a force imparted to said rod may rotate said element.

20. A truck in accordance with claim 19 wherein said rod positioning means on said element includes a plurality of aligned spaced holes of sufficient size to permit said rod to extend through said element.

References Cited in the file of this patent

UNITED STATES PATENTS

| | | |
|---|---|---|
| 2,619,370 | Leger | Nov. 25, 1952 |
| 2,816,516 | Diehl | Dec. 17, 1957 |
| 2,871,799 | King | Feb. 3, 1959 |
| 2,878,758 | D'Altrui | Mar. 24, 1959 |
| 2,936,718 | Bradt et al. | May 17, 1960 |